United States Patent
Sivret

(10) Patent No.: US 9,315,397 B2
(45) Date of Patent: Apr. 19, 2016

(54) BLUE POWER GENERATION SYSTEM

(71) Applicant: Samuel Sivret, Tilley Road (CA)

(72) Inventor: Samuel Sivret, Tilley Road (CA)

(*) Notice: Subject to any disclaimer, the term of this patent is extended or adjusted under 35 U.S.C. 154(b) by 42 days.

(21) Appl. No.: 13/998,779

(22) Filed: Dec. 5, 2013

(65) Prior Publication Data

US 2014/0158529 A1 Jun. 12, 2014

Related U.S. Application Data

(60) Provisional application No. 61/797,561, filed on Dec. 10, 2012.

(51) Int. Cl.

| F03B 13/06 | (2006.01) |
|---|---|
| C02F 1/46 | (2006.01) |
| C25B 1/04 | (2006.01) |
| C25B 15/08 | (2006.01) |
| F03B 17/02 | (2006.01) |
| C02F 103/08 | (2006.01) |

(52) U.S. Cl.
CPC ............... *C02F 1/4604* (2013.01); *C25B 1/04* (2013.01); *C25B 15/08* (2013.01); *F03B 17/02* (2013.01); *C02F 2103/08* (2013.01); *C02F 2201/46165* (2013.01); *F05B 2220/61* (2013.01); *Y02E 10/20* (2013.01); *Y02E 60/366* (2013.01); *Y02E 70/10* (2013.01)

(58) Field of Classification Search
CPC ..... Y02E 10/38; Y02E 10/725; Y02E 10/223; Y02E 70/30; Y02E 10/723; F05B 2240/13; F03B 13/06
USPC ......... 204/193, 194, 242, 157.89, 275.1, 278; 60/398
See application file for complete search history.

(56) References Cited

U.S. PATENT DOCUMENTS

| 3,652,431 A | 3/1972 | Reynolds |
| 3,754,147 A | 8/1973 | Hancock |
| 4,235,693 A | 11/1980 | Rowe |
| 4,490,232 A | 12/1984 | Lapeyre |
| 5,167,786 A | 12/1992 | Eberle |
| 5,872,406 A * | 2/1999 | Ullman et al. .................. 290/53 |
| 6,104,097 A | 8/2000 | Lehoczky |
| 6,692,621 B1 | 2/2004 | Chancellor |
| 7,241,522 B2 * | 7/2007 | Moulthrop et al. ........... 429/411 |
| 7,552,589 B2 | 6/2009 | Mok |

(Continued)

FOREIGN PATENT DOCUMENTS

FR 2286891 4/1976

*Primary Examiner* — Zulmariam Mendez
(74) *Attorney, Agent, or Firm* — Mario Theriault

(57) ABSTRACT

The blue power generation system includes an electrolytic system to obtain hydrogen and oxygen from sea water. It also includes a power generating system to supply electrical energy to the electrolytic system and an installation to recombine hydrogen and oxygen to produce clean fresh water. More specifically, the deep-sea electrolytic reaction generate gases rising into reservoirs at sea level. As water is depleted in the electrolytic chamber, a low pressure is created in the electrolytic chamber. The pressure of makeup water required for the electrolytic reaction is used to drive a turbine and generate electrical power. A portion of the electrical power generated is used to drive the electrolytic reaction. The amount of electrical energy created is a direct relation with the depth at which the system is operated.

5 Claims, 2 Drawing Sheets

(56) References Cited

U.S. PATENT DOCUMENTS

| | | | |
|---|---|---|---|
| 7,911,073 B2 * | 3/2011 | Smith | 290/53 |
| 2002/0108866 A1 * | 8/2002 | Bonilla Griz | 205/637 |
| 2010/0258449 A1 | 10/2010 | Fielder | |
| 2012/0125780 A1 | 5/2012 | Oakes | |

* cited by examiner

BLUE POWER GENERATION SYSTEM

This application claims the benefit of U.S. Provisional Application No. 61/797,561 filed Dec. 10, 2012.

FIELD OF THE INVENTION

This invention pertains to power generation systems, and more particularly, it pertains to offshore power generation in a deep-sea electrolytic installation. This invention also pertains to deep-sea electrolytic installation for obtaining hydrogen and oxygen from sea water and for recombining these gases to produce fresh water in areas of the world where fresh water is needed. The expression "blue power generation system" is used herein for convenience to obviate the need to repeat "electrical power and fresh water generation system".

BACKGROUND OF THE INVENTION

Deep-sea electrolytic systems have been known for some time. These installations use waves, tides and wind to generate some of the electrical power required to feed the electrodes of the installations. Other systems burn the hydrogen produced in a turbine-generator to produce their electricity. Examples of systems in the prior art are listed below.

US Patent Appl. 2002/0108866 published in 2002 by J. L. Bonilla Gritz. This document discloses a system for generating hydrogen which includes an underwater system with positive and negative electrodes and an underwater turbine connected to an electric generator which is, in turn, connected to the electrodes. The turbine in this system is powered by the generated hydrogen gas passing there through.

US Patent Application 2010/0258449 published in 2010 by W. S. Fielder. This publication describes a hydrogen generating system submerged in an ocean. The electrolytic system includes a means for generating electricity which includes hollow turbines connected to an electric generator, which via a rectifier applies positive and negative voltages to the positive and negative electrodes within the electrolytic system. The turbines are operational by the ocean's currents and tides.

French Patent Appl. 2,286,891 published in 2003, by R. J. Imberteche. This document discloses another system for producing hydrogen by electrolysis of water at great depth. The oxygen and hydrogen gases produced are used to drive a turbine, and a generator which in turn supplies power to the electrodes.

More generally, the documents identified hereinafter describe other deep-sea electrolytic installations:
U.S. Pat. No. 3,652,431 issued to J. L. Reynolds on Mar. 28, 1972.
U.S. Pat. No. 3,754,147 issued to B. J. Hancock et al. on Aug. 21, 1973;
U.S. Pat. No. 4,490,232 issued to J. M. Lapeyre on Dec. 25, 1984, and
U.S. Pat. No. 6,692,621 issued to D. Chancellor on Feb. 17, 2004.

These documents identify two main advantages. Firstly, the prior inventors have experienced a reduction in energy requirement for electrolysis when the reaction is carried out under great pressure. Secondly, deep-sea pressure on an electrolytic system eliminates the need for a compressor in the system to compress the gases produced.

While prior inventors have been interested in the efficiency of deep-sea installations, and in the head pressure to compress the gas produced, it is believed that another advantage exists. It is believed that the potential pressure at which the makeup water is introduced in the electrolytic chamber represents a source of energy that has been ignored in the past.

SUMMARY OF THE INVENTION

The blue power generation system according to the present invention includes an electrolytic system to obtain hydrogen and oxygen from sea water. It also includes a power generating system to supply electrical energy to the electrolytic system, and an installation to recombine hydrogen and oxygen to produce clean fresh water. More specifically, the deep-sea electrolytic reaction generates gases rising into reservoirs at sea level. As water is depleted in the electrolytic chamber, a low pressure is created in the electrolytic chamber. The pressure of makeup water required for the electrolytic reaction is used to drive a turbine and generate electrical power. The amount of electrical energy created is a direct relation with the depth at which the system is operated.

In the blue power generation system according to the present invention, the pressure and flow of the makeup water entering into the electrolytic chamber is used to rotate a turbine and a generator to produce some and perhaps all the energy required by the electrolytic reaction. The byproducts are hydrogen, oxygen and other useful gases such as chlorine and hydroxide compounds. Hydrogen can be combusted, used in fuel cells or in other mean to generate more energy, but can also be recombine to oxygen to form pure water which may be very beneficial in some areas of the world.

In another aspect of the blue power generation system according to the present invention, there is provided a deep-sea electrolytic installation, comprising an electrolytic reservoir that is mounted and anchored at a great depth under the ocean surface. This reservoir has a pair of electrodes mounted therein, gas conduits extending from the electrodes to the ocean surface; and an air vent extending therefrom and to a distance above the ocean surface. The air vent is open to the electrolytic reservoir and to atmosphere above the ocean surface such that the pressure inside the electrolytic reservoir is maintained at substantially atmospheric pressure.

A water makeup valve and conduit are connected to the electrolytic reservoir. A turbine-generator is connected to the conduit and to the water makeup valve. The turbine-generator has a water intake opening at this great depth, such that when the water makeup valve is opened, sea water rushes through the water intake opening and through the turbine-generator for rotating the turbine-generator and for producing electrical power.

According to energy calculations described herein after, an operation of the blue power generation system according to the present invention at a depth of 5000 meter, (16,400 feet) generates sufficient electrical power to support the electrolytic process. Of course, users of the blue power generation system according to the present invention can choose to operate this system in a stand-alone continuous mode at this great depth. Users of the blue power generation system according to the present invention can also choose to operate the system in combination with a wind turbine, a solar panel or an hydrogen engine-generator, and adjust the installation depth to compensate for applicable efficiencies and power losses. Other sources of outside, make-up electrical power for use with the present system also includes devices such as a wave motor and a tide motor.

When the blue power generation system according to the present invention is operated at a depth of 300 meter (984 ft.) and a flow rate of 112 liter (29.6 US gal.) of water per second, for example, the energy required by the electrolytic reaction, with a 60% electrolyze efficiency, is only 10% of the chemical energy stored in the hydrogen produced. An hydrogen engine-generator is therefore a good option to produce the energy required in relatively low depth installations.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings; in which.

DESCRIPTION OF THE PREFERRED EMBODIMENT

Figure 1:
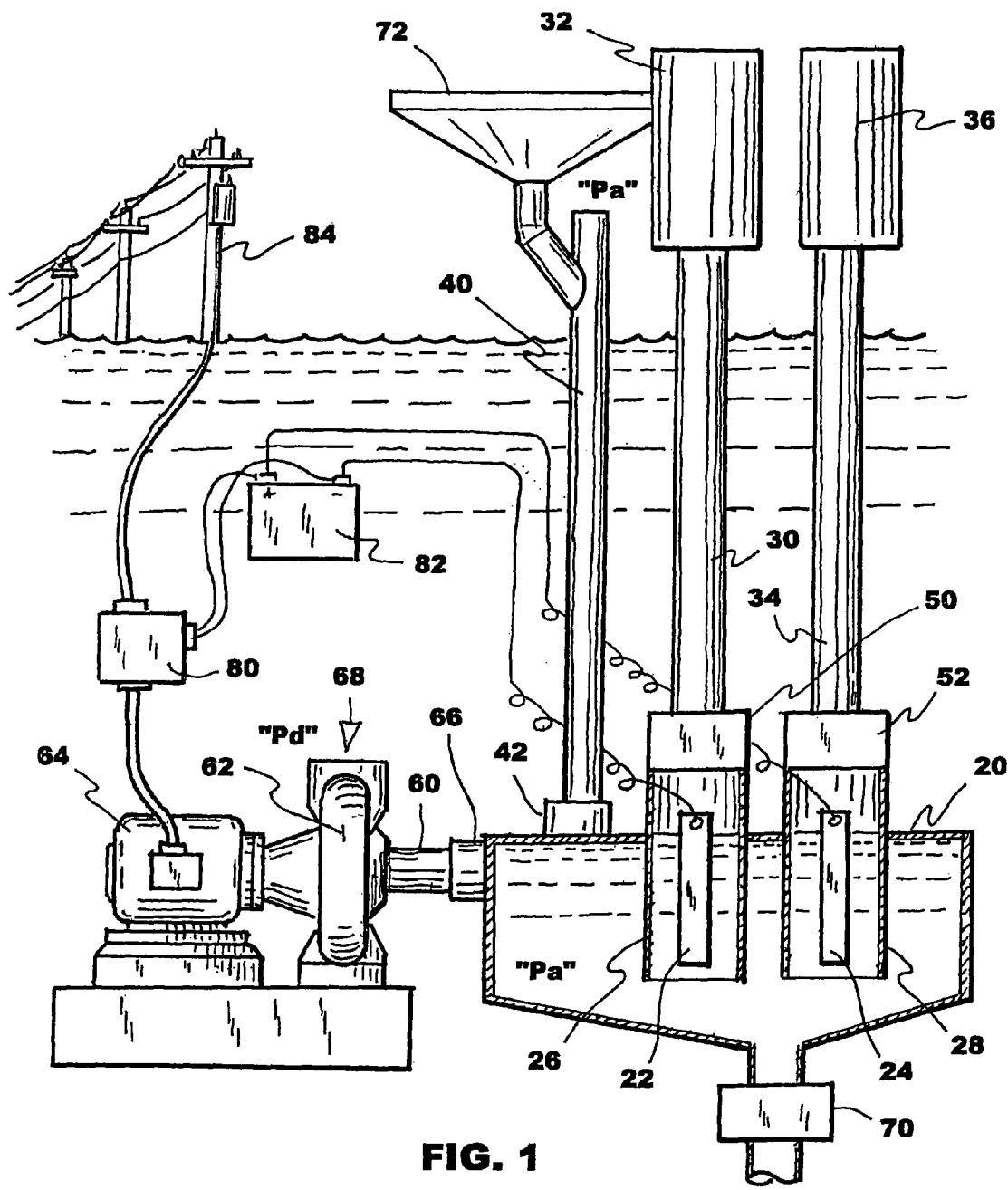
FIG. 1 is a schematic representation of the preferred blue power generation system according to a preferred embodiment of the present invention.

Referring to FIG. 1, the preferred blue power generation system comprises principally an electrolytic reservoir 20. The electrolytic reservoir 20 is installed and anchored at a great depth, under water. A preferred depth is in the range of 100 meters (328 feet) to 300 meters (984 feet) or more. Of course, the electrolytic reservoir is built to resist the head pressure that is found at these depths.

A cathode 22 and an anode 24 are suspended inside the electrolytic reservoir 20. Each of the cathode 22 and anode 24 are enclosed in a tubular shroud, which are labelled 26 and 28 respectively. The purpose of these shrouds is to prevent the mixing of the hydrogen and oxygen after these gases have been separated from sea water.

A first gas conduit 30 extends upward from the electrolytic reservoir 20 above the cathode 22 and shroud 26 for carrying hydrogen gas from the cathode 22 to a hydrogen storage reservoir 32 at the surface of the ocean.

Similarly, a second gas conduit 34 extends upward from the electrolytic reservoir 20 above the anode 24 and shroud 28 for carrying oxygen gas from the anode to an oxygen storage reservoir 36 at the surface of the ocean.

The electrolytic reservoir 20 has a vent pipe 40 extending therefrom and to a distance above the surface of the ocean. The vent pipe 40 is mounted to a shut-off valve 42 at its connection to the electrolytic reservoir 20. The purpose of the vent pipe 40 is to maintain the pressure inside the electrolytic reservoir 20 at substantially atmospheric pressure "Pa".

This invention is described herein as a deep-sea operation but it is not limited to it; other water body may also be used.

Shut-off valves 50, 52 may also be installed at the bases of the gas conduits 30, 34 respectively and operated intermittently to increase the pressure and efficiency of the electrolytic process.

The electrolytic reservoir 20 also has an inlet pipe 60 through which makeup water is introduced therein. A turbine 62 is connected to the inlet pipe 60, and a generator 64 is coupled to the turbine 62. A water makeup valve 66 lets water under pressure flow through the turbine 62 to replenish the electrolytic reservoir 20 as required.

Because seawater generally contains impurities such as magnesium, calcium and potassium, a certain quantity of impurities may accumulate at the bottom of the electrolytic reservoir 20. A dump valve 70 is preferably provided at the bottom of the electrolytic reservoir 20 to periodically flush the reservoir of these accumulations, when efficiency drops below a certain level, for example.

A rainwater collector 72 is also preferably used to collect freshwater for use in the electrolytic chamber 20, to partially complement the intake of seawater, and to improve on the efficiency of the electrolytic reaction. This rainwater collector 72 is preferable mounted to the top of the vent pipe 40.

The pressure at the turbine inlet opening 68 is basically a pressure that is found at the depth at which the electrolytic system is installed. This pressure is referred to as the head pressure "Pd". For example, a pressure that can be found at 305 m (1,000 ft.) deep would be approximately 430 psi. The flow of water through the turbine 62 at the pressure "Pd" is used to generate electrical energy.

The generator 64 is connected to a battery charger 80 which in turn is used to charge one or more batteries 82. These batteries 82 are connected to the electrodes 22, 24 to operate the electrolytic process.

In use, the reservoir 20 is first filled up with sea water. Water makeup valve 66 is then closed and power is applied to the electrodes 22, 24. As power is applied to the electrodes 22, 24, water inside the electrolytic reservoir 20 is separated into hydrogen and oxygen gases, and other secondary by-products. These gases rise to the gas storage reservoirs 32, 36 to expand in these storage reservoirs.

As hydrogen and oxygen gases are generated, the level of water in the electrolytic reservoir 20 drops accordingly. The pressure inside the electrolytic reservoir 20 is maintained at atmospheric pressure "Pa" due to the vent pipe 40.

The gases rising to the storage reservoirs 32, 36 are preferably used right away in a fuel cell for example or in other power plants, or are compressed for future uses in other equipment not illustrated herein. The use of the gases generated, and the operation performed on these gases are not illustrated and described herein because this is not the focus of the present invention. Similarly, the system for recombination of oxygen and hydrogen to produce and store fresh water is not illustrated because these systems are known in the art.

When the water content of the electrolytic reservoir 20 has lowered and reached a level near the lower end of the electrodes 22, 24, the water makeup valve 66 is opened. Sea water rushes through the inlet opening 68 with a pressure "Pd", causing the turbine 62 and the generator 64 to rotate and to charge the batteries 82. A level switch (not shown) is preferably installed in the electrolytic reservoir 20. This switch is preferably connected to a programmable logic controller for example (not shown), to monitor the water level, and to open and close the water makeup valve 66 at appropriate time intervals.

It will be appreciated that the makeup water may be introduced in the electrolytic reservoir 20 in discrete volumes, as described above, or on a continuous basis, by adjusting the flow of water through the turbine 62 and by balancing that flow with the consumption of water by the electrolytic process. In a continuous process, the turbine 62 would be rotated continually.

In the case where the flow of the makeup water through the turbine 62 is insufficient to generate enough energy to satisfy the demand of the electrolytic process, additional power may be drawn from a nearby power grid as illustrated at label 84. On the other hand, if excess power is available from the turbine and generator set 62, 64, such excess power may be pump back into the power grid 84.

The operation of the present power generation system is believed to comply with the following principle;

$$P(\text{Hydro}) + P(\text{Hydrogen}) > P(\text{Electrolysis}) + P(\text{Station Service})$$

wherein:

P(Hydro) being the power generated through the turbine 62 by the flow and pressure of the makeup water;

P(Hydrogen) being the potential energy in the hydrogen gas produced;

P(Electrolysis) being the power consumed to electrolyze a volume of water;

P(Station Service) being the power required to operate the system.

More specifically;

$$P(\text{Hydro}) = \mu V \rho g h,$$

where $\mu$=efficiency coefficient;

V=Volume of mass (water solution) per second (m$^3$/s);

$\rho$=density of mass (water solution in this case)~1000 Kg/m$^3$ @ 4° C.;

g=gravitational acceleration (9.81 m/s$^2$);

h=depth from the ocean surface to the turbine intake opening;

P(Hydrogen) The power generated by the hydrogen is variable and depends on the way it is used, i.e. combustion, fuel cells, stored, etc.; all methods of use becoming a positive energy in the equation.

$$P(\text{Electrolysis}) = VI$$

V=Voltage applied to electrolyze the water;
I=current applied to electrolyze the water;
The electrolyze of water is dependent on many variables such as the electrode material and surface area, the conductivity of the water solution, the voltage and current applied, etc.

$$P(\text{Station Service}) = VI$$

V=Voltage applied for the station service;
I=current applied for the station service;
The station service power is the power consumed by the system to operate different control devices such as valves, switches, programmable logic controllers, battery charger controls, etc.

Ultimately, the major variables on the system are; system depth, water solution conductivity, electrode material and surface area, and voltage.

Conducting electrolysis at pressures in excess of ambient is known to increase the efficiency and lower the potential required, on account of lowered impedance and a change in the enthalpy and free energy of the process. The advantage can be as much as 10% at pressure corresponding to depths of 300-500 meters (984-1640 ft.), as taught in Chancellor, (U.S. Pat. No. 6,692,621).

The blue power generation system according to the preferred embodiment of the present invention operates at ambient pressure, with the evolved gases being vented from the electrolytic chamber 20 to the reservoirs 32 and 36. Because of the shut-off valves 50, 52, pressure is allowed to build in the electrolytic reservoir 20. This allows the electrolysis to be conducted under local high pressure to reap the benefits of the increased efficiency described in Chancellor. The gas pressure can be vented intermittently, or at the end of each electrolysis cycle when the electrolytic chamber 20 is replenished.

It is known that the thermodynamic amount of energy required to electrolyze 1 liter (0.2642 US gal.) of water is 26,870 kJ (7.46 kw-hr). At 100% electrical and thermodynamic efficiency, a 5 MW turbine could generate sufficient electrical power to electrolyze 186 liter (49.1 US gal.) of water per second. At 60% overall efficiency this volume becomes 112 liter/s (29.6 US gal./s).

Using the energy formula on page 9, a column of water 100 m (328 ft.) high flowing over a turbine at a rate of 112 L/s (29.6 US gal./s) will give 112 kW of potential energy. Most modern water turbines are around 90% efficient, so 100 kW of electrical power could be generated through the turbine, or 300 kW if the electrolytic system is operated at a depth of 300 m (984 ft.). Because the equation mentioned above is linear, operating the preferred electrolytic system at a depth of 5,000 m (16,400 ft.) provides all the energy required to electrolyze 112 L (29.6 US gal.) of water per second. Below that depth surplus energy is generated, as illustrated in FIG. 2.

Figure 2:
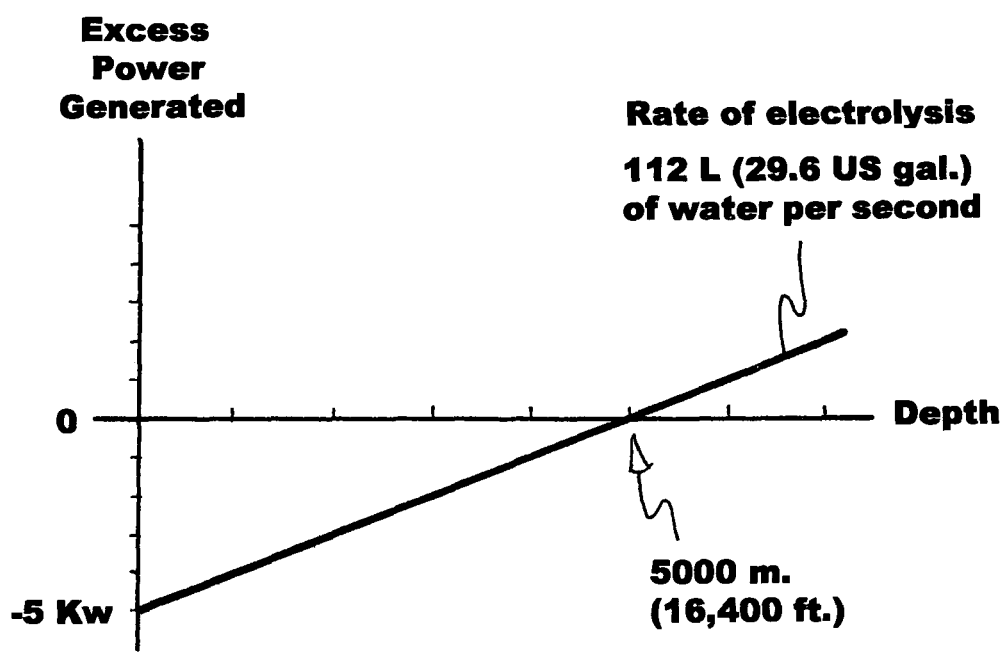
FIG. 2 is a graph illustrating a relation between a depth of the system and potential electrical energy.

In reference with FIG. 2, it is believed that further study will demonstrate that excess power can also be generated at lesser depths by varying the flow of water through the electrolysis process.

What is claimed is:

1. An electrolytic system for producing hydrogen and oxygen gases from water comprising:

a reservoir mounted at a great water depth in a body of water;

said reservoir containing a water content and a pair of electrodes exposed to said water content;

said electrodes being connected to a battery;

said reservoir having a turbine and an electric generator connected thereto; said turbine having a water inlet opening for passing a flow of makeup water through said turbine and for maintaining stable a level of said water content in said reservoir; said water inlet opening being exposed to a turbine pressure equivalent to a water pressure at said great water depth;

said flow of makeup water operating said turbine at said turbine pressure and said electric generator;

said reservoir having a vent pipe extending therefrom to a height above said great water depth to atmospheric pressure; said vent pipe communicating with said water content for maintaining said water content inside said reservoir at said atmospheric pressure;

said water inlet opening comprising a valve for controlling said flow of makeup water into said reservoir and for controlling a rate of electrolysis separation of said water content into oxygen and hydrogen gases;

said great water depth being a determination from a linear equation that is dependent on a conductivity of said water, material and surface area of said electrodes, a voltage from said battery at said electrodes, and a capacity of said turbine and electrical generator, such that an electrical power generated by said electric generator at said flow of makeup water through said turbine is equal or more than an electrical energy drawn by said electrodes from said battery to operate said electrodes at said rate of electrolysis separation.

2. The electrolytic system as claimed in claim 1, wherein said great water depth is deeper than 5000 meters under a surface of said body of water.

3. The electrolytic system as claimed in claim 1, wherein said rate of electrolysis separation is 112 L/s or more.

4. The electrolytic system as claimed in claim 1, further including a rainwater collector on an upper end of said vent pipe for introducing rainwater into said reservoir.

5. The electrolytic system as claimed in claim 1, wherein said generator is connected to said battery for charging said battery.

* * * * *